United States Patent [19]
Rohrberg et al.

[11] Patent Number: 6,106,870
[45] Date of Patent: Aug. 22, 2000

[54] HEALTHY BIRD™ AVIAN NUTRITION SYSTEM

[75] Inventors: Roderick G. Rohrberg, Torrance, Calif.; Thomas C. Lillie, Henderson, Nev.

[73] Assignee: Healthy Bird Corporation, Torrance, Calif.

[21] Appl. No.: 09/261,673

[22] Filed: Mar. 3, 1999

[51] Int. Cl.⁷ .................................................... A23L 1/212
[52] U.S. Cl. .............................. 426/2; 426/622; 426/623; 426/630; 426/805
[58] Field of Search ............................... 426/2, 805, 622, 426/623, 630

[56] References Cited

PUBLICATIONS

Brinker, Pet Bird Magazine, Sep., 1996.
Schimel, Pet Bird Magazine, Aug., 1997.
Swicegood, Pet Bird Magazine Oct., 1998.
Henson, Bird World Magazine, vol. 15, # 4, 1993.
Blanchard, The Pet Bird Report, Issue No. 13, Oct., 1993.
Gallagher, Parrot Society of Australia News, Sep./Oct., 1995.
McWatters, Alicia McWatters Avian Diets, Mar., 1997.
Johnson, "Nutrition", Apr., 1998.

*Primary Examiner*—Chhaya D. Sayala
*Attorney, Agent, or Firm*—Anglin & Giaccherini

[57] ABSTRACT

Methods and liquified dietary supplements for enhancing and maintaining the health of birds are disclosed. The invention also includes dietary supplements which are intended to promote avian well-being by providing a daily regimen of two specifically designed formulas. The Healthy Bird™ Sunrise Formula is a morning supplement which furnishes quick energy, and maintains the natural acid base balance of the bird. The Healthy Bird™ Sunset Formula is an evening supplement which enables the bird to begin its rest cycle. Both preparations are novel compositions which furnish highly nutritional dietary regimens for domesticated birds.

13 Claims, No Drawings

HEALTHY BIRD™ AVIAN NUTRITION SYSTEM

The title of the invention is the Healthy Bird™ Avian Nutrition System. The inventors are Roderick G. Rohrberg of 2742 West 234th Street Torrance, Calif. 90505 and Lillie C. Thomas of 116 Huckleberry Lane, Henderson, Nevada 89014. Both inventors are U.S. citizens. Healthy Bird™ is a Trade and Service Mark owned by Roderick G. Rohrberg.

FEDERALLY SPONSORED RESEARCH OR DEVELOPMENT

Not Applicable.

FIELD OF THE INVENTION

The present invention is a system of promoting and maintaining the health of birds. The invention includes methods and compositions for enhancing avian vitality by providing a customized nutritional regimen that replicates the diet that is available to birds in their natural environments.

BACKGROUND OF THE INVENTION

A wide variety of bird food is available in the commercial marketplace. Most of these bird foods are mass-produced, are sold at a relatively low cost and contain fillers, by-products and other undesirable materials. These conventional products generally meet the minimum dietary requirements of birds, but do not furnish the complex combination of nutritional components that enable birds to thrive in a domestic setting where their natural sources of food are unavailable. Commonly available bird foods, which usually comprise a mixture of a few types of dead seeds, are not designed to satisfy all the nourishment needs of exotic pet birds. As a result, many domesticated birds are susceptible to sickness and diseases, never achieve their natural intense coloration, are unable to successfully reproduce and generally do not have the opportunity to enjoy a healthy life.

SUMMARY OF THE INVENTION

The Healthy Bird™ Avian Nutrition System comprises methods for enhancing and maintaining the well-being of birds. The invention also comprises mixtures for dietary supplements which are intended to promote avian health by providing a daily regimen of two specifically designed formulas. The Healthy Bird™ Sunrise Formula is a morning supplement which furnishes quick energy and maintains the natural acid base balance of the bird. The Healthy Bird™ Sunset Formula is an evening supplement which enables the bird to begin its rest cycle. Both preparations are novel compositions which furnish highly nutritional dietary regimens for domesticated birds.

An appreciation of other aims and objectives of the present invention and a more complete and comprehensive understanding of this invention may be achieved by studying the following description of preferred and alternative embodiments.

DETAILED DESCRIPTION OF PREFERRED & ALTERNATIVE EMBODIMENTS

The Healthy Bird™ Avian Nutrition System offers a major improvement in the field of avian health. Unlike conventional bird foods, which sometimes contain dead seeds and undesirable fillers, the present invention satisfies the dietary needs of domesticated birds by providing a wide variety of nutrients which are available in their natural environment. The present invention comprises a feeding method which takes into account the disparate needs of pet birds at different times of the day. The two general classes of novel mixtures, the Healthy Bird™ Sunrise Formula and the Healthy Bird™ Sunset Formula, are particularly adapted to supply birds with the optimal combination of nutritive elements during the morning and evening. The inventor owns Trade and Service Mark rights to the term Healthy Bird™.

Exotic birds are unique individuals. Parrot diets vary as widely as the size, coloration and personalities of the birds. (Schimel, et al., "Avian Nutrition," Pet Bird Magazine, August, 1997.) In the wild, psittascine species eat a varied diet of fruits, vegetables, sprouts, soil, mineral deposits, meats and fish. Birds are opportunistic carnivores, eating what they can find. They possess an innate knowledge of how to select the appropriate components from offerings in the wild to ensure a balanced diet. Domesticated birds, however, do not enjoy a wide variety of natural dietary foodstuffs. Common commercial bird foods usually contain pelleted fodder which supplies the sole source of dietary intake. In the wild, this type of low grade comestibles would be consumed only if no other form of nourishment were available. In many commercial preparations, the pellets are not consumed because the bird does not recognize them as food, does not find their shape to be interesting, or does not find the taste appealing. Some conventional bird foods offer a variety of seeds and fortified pellets. A bird will typically waste approximately 50% or more of the seeds and pellets in this mixture, picking and choosing which items to eat and which to discard. Proper and adequate nutrition combined with good clean living environments are the single most important factor in insuring that pet birds live a long and healthy life. Good husbandry is straightforward, as good lighting, toys, companionship, and a roomy clean environment are readily provided by most owners. Good nutrition, however, is almost impossible to achieve using commercially available foods. Making the bird's self-selected diet equal to the wild diet is virtually impossible to achieve. A Dutch study found that 60% of the exotic birds presented for necropsy showed signs of nutritional deficiency. (Van der Hage, MH "Feed for Parrots: *Tijdschr Diergeneeskd*, August, 1993, 118916: pp. 526–7.) This is probably the reason for short lives in captivity and reproductive failure for most exotic birds, while they live extended lives in the wild.

The metabolism of the major nutrients from fresh seeds is generally found to be greater than 80%. Earl KE and Clark NR, "The Nutrition of the Budgerigar," Journal of Nutrition, 191 Nov; 121(11 Supplement): S186–92. Commercial seed products often are not alive when the consumer purchases them. The birds obtain their nutrition form the living centers of the seeds. If seeds do not sprout after being kept in water for three to five days, the seeds are not alive, and will not offer proper nutrition to the bird, as the nutrition is obtained from the living centers of the seeds. Dead seed should not be fed to birds.

As a precaution, seed mixtures should be frozen for 24 hours to eliminate any bacteria or fungus. Seed diets selected should also limit the amount of sunflower seed used. While birds enjoy these seeds, their nutritional value is sparse, and birds will consume them in lieu of other more nutritious selections. While little is known about the complete optimal composition of the avian diet, as any living creature, they have needs for proper combinations of protein, fats, carbohydrates and micro-nutrients (vitamins and minerals) to maintain optimal health.

Energy

Exotic birds have been found to require approximately 48 to 128 kJ 172 to 460 calories per day (the test birds weighed 30 to 80 grams). Heavier birds will have larger requirement. Mating pairs will double their energy intakes to an average of 231 kJ (831 calories.) Requirements for other macronutrients (proteins, carbohydrates, and fats) are recommended as a percentage of energy required.

Proteins

Protein is essential to all living creatures. For birds, it is important in the development of muscle tissue, bone, the immune system and blood components. Seed diets provide a large quantity of crude protein, sufficient to meet the general requirements of a diet which requires 20% crude protein for optimal growth. Proteins are made up of 22 amino acids, 10 of which are essential. Essential amino acids are those which cannot be manufactured by the body. Essential amino acids must be consumed daily. The limiting amino acid in the psittacine diet is lysine. This is also the limiting amino acid in the human diet. I lumans derive this amino acid in significant quantities from eggs and milk. Sufficient quantities are lysine can be obtained from plant sources, provided sufficient quantities and proper selections are consumed. The seed diet is insufficient to maintain optimal health.

Fat

While there is no specific requirement for fat in the diet, there is a specific requirement for the fatty acids that are obtained from fats. Birds use fats for energy, key vitamin absorption (A, D and E) and general feather condition. Linoleic acid is an essential fatty acid, and is most important. It cannot be synthesized by the body, and must be obtained from food. Seed diets rarely fall short of providing the essential fatty acids (unless the seeds are dead), and the requirements for essential fatty acids are 1% to 1.5% of the diet. Fats in total should comprise no more than 15% of the bird's diet. Excessive consumption of fatty food can lead to obesity. An overweight bird loses energy, and it can lead to early death. The fatty deposits are most noticeable in the chest of the bird.

Carbohydrates

This macro nutrient is extremely important for the bird, because it is the only energy source that the brain can use. It is also a source of quick energy for the bird. As they are lower calorie density than fats, birds can eat enough variety to provide adequate nutrition. Fats are the most efficient calorie source for birds because the metabolism is easier, however, because birds eat only to satisfy their energy requirements, high fat diets (seed diets by their nature are high in fat) they will not consume enough to meet their nutritional needs. Carbohydrates should comprise 65% to 70% of the bird's diet.

Vitamins

Their are two types of vitamins, fat soluble (Vitamin A, E and D) and water soluble (Vitamin B1- thiamine, B2- riboflavin, niacin, B6- pyridoxine, Vitamin C, pantothenic acid, biotin, folic acid and Vitamin B12. (Gallagher, Adrian DMV, "*Avian Nutrition- Part I*," Parrot Society of Australia, July, 1998.) Psittacines kept as pets show a predisposition to Vitamin A deficiency. (Hollmann, P. "*Sublingual Salivary Gland Granuloma as a Husbandry Induced Disease,*" Tierarztl Prax, June, 1990, 18(3): pp. 267–272.) The reason for this is that dry seed diets are low in this vital vitamin. Birds cannot obtain Vitamin A from the plants directly, but from its precursor, carotenoids. Carotenoids are found in dark green, yellow, or orange vegetables. Carotenoids are not available from seeds. Vitamin A deficiency is the leading cause of death in captive birds. Vitamin D3 is manufactured by the body. The precursors are believed to be secreted by the preen gland, and is spread over the feathers. Then exposure to UV light converts it to Vitamin D3, and it is re-ingested. Vitamin D3 is essential, because it is required for the metabolism of calcium. Exposure to unfiltered light for a period of 11 to 45 minutes per day was sufficient to provide proper levels of Vitamin D3. Vitamin D should not be supplemented, because it is possible to over-supplement the diet, and this leads to calcification of the organs, especially the kidneys, which can lead to visceral gout and death. Macaws and Cockatiels may be particularly susceptible to excessive levels. Vitamin E is generally supplied in adequate amounts from a seed diet, as it is readily derived from the oils of seeds. It is generally not deficient in avian diets. Vitamin Ba (thiamine) and Vitamin B2 (riboflavin) readily occur in seeds, and are rarely deficient. Niacin and pyridoxine (B6) are also part of the B group. The deficiency of niacin and pyridoxine have not been described in psittacines. Pantothenic Acid and Biotin are vitamin precursors in feather development.

Minerals

The minerals required for avian health are calcium, phosphorus, iron, magnesium, manganese and zinc. Of these, calcium is most important for skeletal health and feather health. Calcium is key to bone health. Female birds who are calcium depleted may die if they try to lay eggs. Phosphorous must be consumed in proportion with the calcium provided in the diet and in combination with Vitamin D3 in order for the bird to obtain the nutritional advantage from ingested calcium.

The Healthy Bird™ Sunrise and Sunset Formulas

The Sunrise and Sunset formulas are balanced to provide the essential nutritional supplementation to complete seed diets. A healthy bird has clear eyes, bright coloration and a good disposition. The formulas are divided into Sunrise and Sunset formulas. The Sunrise formula contains fruits, which should be fed in the morning for quick energy, and to maintain the natural acid base balance of the bird. The Sunset formula contains vegetables, and is more neutral in composition. Sunset allows the bird to prepare for its sleep cycle. The Healthy Bird program is designed to supplement the self-selected diet of the birds to provide balance. It is designed to provide the elements missing in the regularly consumed bird diet. Preferred and alternative embodiments of the Sunrise and Sunset formulas are described in Tables One and Two. Tables Three, Four and Five present nutritional analyses of the Sunrise and Sunset formulas. Tables Six and Seven present directions for use for the Sunrise and Sunset formulas. All of the formulas disclosed may be varied to suit the particular needs of the birds. Alternative embodiments may be characterized by variations that are suited to each particular use.

TABLE One

| Ingredient | Sunrise | Sunset |
|---|---|---|
| Wheat Flour, whole grain | 12.0000 grams | 12.0000 grams |
| Oat Flour, Infant cereal | 6.0000 grams | 6.0000 grams |
| Corn Flour, yellow | 6.0000 grams | 6.0000 grams |
| Soy Flour, defatted | 6.0000 grams | 6.0000 grams |
| Barley Flour, Infant cereal | 6.0000 grams | 6.0000 grams |
| Rye Flour, medium | 6.0000 grams | 6.0000 grams |
| Apple Solids | 121.062 grams | 93.862 grams |
| Orange Solids | 27.390 grams | 27.390 grams |
| Banana Solids | 64.2544 grams | 64.2544 grams |
| Broccoli | — | 2.7330 grams |

TABLE One-continued

| Ingredient | Sunrise | Sunset |
|---|---|---|
| Carrot | — | 5.8660 grams |
| Cauliflower | — | 2.5999 grams |
| Spirulina | 2.0000 grams | 2.0000 grams |
| Wheat Grass | 2.5000 grams | 2.5000 grams |
| TOTAL DRY | 152.8532 grams | 152.9512 grams |
| Water | 16 ounces | 16 ounces |

TABLE Two

Healthy Bird Liquid Formula Recipes

| Ingredient | Sunrise | Sunset |
|---|---|---|
| Wheat Flour | 12 grams | 12 grams |
| Oat Flour | 6 grams | 6 grams |
| Corn Flour | 6 grams | 6 grams |
| Soy Flour | 6 grams | 6 grams |
| Barley Flour | 6 grams | 6 grams |
| Rye Flour | 6 grams | 6 grams |
| Peanut Butter | 12 grams | 12 grams |
| Apple | ½ whole | — |
| Apple juice | 1 ½ cups | 1 ½ cups |
| Orange juice | ½ cups | ½ cups |
| Banana | 1 whole | 1 whole |
| Broccoli | — | ⅓ cups |
| Carrot | — | ⅓ cups |
| Cauliflower | — | ⅓ cups |
| Spirulina | ⅓ tsp. | ⅓ tsp. |
| Wheat Grass | ⅓ tsp. | ⅓ tsp. |

TABLE Three

SUNRISE FORMULA

| Nutrient | 8 ounces | Parakeets 2 cc./day | S. Exotics 5 cc./day | M. Exotics 30 cc./day | L. Exotics 50 cc./day |
|---|---|---|---|---|---|
| COMPLETE NUTRIENT ANALYSIS | | | | | |
| Calories | 1350 | 1 | 3 | 17 | 29 |
| Crude Protein, gr. | 2.9 | 0.02 | 0.06 | 0.4 | 0.6 |
| Crude Fat, grams | 1 | 0.01 | 0.02 | 0.1 | 0.2 |
| Carbohydrates, gr. | 31 | 0.3 | 0.7 | 3.9 | 6.6 |
| Moisture, gr. | 9.3 | 0.08 | 0.2 | 1.2 | 2 |
| Crude Fiber, gr. | 1.58 | 0.01 | 0.03 | 0.2 | 0.3 |
| VITAMINS | | | | | |
| Vitamin A, IU | 1642 | 14 | 35 | 208 | 347 |
| Thiamine (B1), mg. | 0.5 | 0 | 0.01 | 0.06 | 0.1 |
| Riboflavin (B2), mg | 0.2 | 0 | 0 | 0.02 | 0.04 |
| Niacin, mg. | 1.6 | 0.01 | 0.03 | 0.2 | 0.3 |
| Vitamin B6, mg. | 0.26 | 0 | 0 | 0.03 | 0.05 |
| Vitamin C, mg. | 15 | 0.1 | 0.3 | 2 | 3 |
| Folic Acid, mcg. | 13 | 0.1 | 0.3 | 2 | 3 |
| MINERALS | | | | | |
| Sodium, mg. | 6 | 0.05 | 0.1 | 0.7 | 1 |
| Calcium, mg. | 40 | 0.3 | 0.8 | 5 | 8 |
| Iron, mg. | 3.1 | 0.02 | 0.06 | 0.4 | 0.7 |
| Magnesium, mg. | 24.3 | 0.2 | 0.5 | 3 | 5 |
| Manganese, mg. | 0.24 | 0 | 0 | 0.03 | 0.05 |
| Phosphorus, mg. | 57 | 0.4 | 1 | 7 | 12 |
| Zinc, mg. | 0.36 | 0 | 0.01 | 0.04 | 0.08 |
| Potassium, mg. | 373 | 3 | 8 | 47 | 79 |

TABLE Four

SUNSET FORMULA

| Nutrient | 8 ounces | Parakeets 2 cc./day | S. Exotics 5 cc./day | M. Exotics 30 cc./day | L. Exotics 50 cc./day |
|---|---|---|---|---|---|
| COMPLETE NUTRIENT ANALYSIS | | | | | |
| Calories | 123 | 1 | 3 | 16 | 26 |
| Crude Protein, gr. | 2.8 | 0.02 | 0.05 | 0.4 | 0.6 |
| Crude Fat, grams | 0.93 | 0.01 | 0.02 | 0.1 | 0.2 |
| Carbohydrates, gr. | 28 | 0.2 | 0.6 | 3.5 | 6 |
| Moisture, gr. | 8.4 | 0.07 | 0.2 | 1 | 1.7 |
| Crude Fiber, gr. | 1.3 | 0.01 | 0.02 | 0.2 | 0.3 |
| VITAMINS | | | | | |
| Vitamin A, IU | 1747 | 15 | 37 | 222 | 369 |
| Thiamine (B1), mg. | 0.4 | 0 | 0.01 | 0.05 | 0.1 |
| Riboflavin (B2), mg | 0.18 | 0 | 0 | 0 | 0.03 |
| Niacin, mg. | 1.55 | 0.01 | 0.03 | 0.2 | 0.3 |
| Vitamin B6, mg. | 0.29 | 0 | 0 | 0.04 | 0.06 |
| Vitamin C, mg. | 28 | 0.2 | 0.6 | 4 | 6 |
| Folic Acid, mcg. | 24 | 0.2 | 0.5 | 3 | 5 |
| MINERALS | | | | | |
| Sodium, mg. | 8 | 0.1 | 0.2 | 1 | 2 |
| Calcium, mg. | 44 | 0.4 | 0.9 | 6 | 9 |
| Iron, mg. | 3.1 | 0.02 | 0.06 | 0.4 | 0.7 |
| Magnesium, mg. | 29 | 0.2 | 0.6 | 3.7 | 6.1 |
| Manganese, mg. | 0.22 | 0 | 0 | 0.02 | 0.05 |
| Phosphorus, mg. | 54 | 0.5 | 1.0 | 7 | 11 |
| Zinc. mg. | 0.26 | 0 | 0 | 0 | 0.05 |
| Potassium, mg. | 440 | 4 | 9 | 56 | 93 |

TABLE Five

ESSENTIAL AMINO ACIDS

| Essential Amino Acid | 8 oz | Parakeet 2 cc/day | S. Exotics 5 cc/day | M. Exotic 30 cc/day | L. Exotic 50 cc/day |
|---|---|---|---|---|---|
| SUNRISE FORMULA | | | | | |
| Arginine, mg. | 133.4 | 1.1 | 2.8 | 16.9 | 28.2 |
| Glycine, mg. | 102.5 | 0.9 | 2.2 | 12.9 | 21.6 |
| Threonine, mg. | 69 | 0.6 | 1.5 | 8.8 | 14.6 |
| Lysine, mg. | 99.9 | 0.8 | 2.1 | 12.6 | 21.1 |
| Methionine, mg. | 25.6 | 0.2 | 0.5 | 3.2 | 5.4 |
| Tryptophan, mg. | 55.9 | 0.5 | 1.2 | 7 | 11.8 |
| SUNSET FORMULA | | | | | |
| Arginine, mg. | 146.1 | 1.2 | 3 | 18.5 | 30.9 |
| Glycine, mg. | 122.5 | 1 | 2.6 | 15.5 | 25.9 |
| Threonine, mg. | 81.6 | 0.7 | 1.7 | 10.3 | 17.2 |
| Lysine, mg. | 118.9 | 1 | 2.5 | 15.1 | 25.1 |
| Methionine, mg. | 30.4 | 0.3 | 0.6 | 3.9 | 6.4 |
| Tryptophan, mg. | 61.7 | 0.5 | 1.3 | 7.8 | 13 |

TABLE Six

All ingredients in Healthy Bird are part of your bird's natural diet. A healthy bird has feathers which are soft and iridescent. When used with the SUNRISE FORMULA, Healthy Bird can provide the nutrition your bird needs.
INGREDIENTS: Apple solids, orange solids, banana solids, wheat flour, oat flour, corn flour, soy flour, barley flour, rye flour, spirulina, wheat grass, carrot solids, broccolli solids, cauliflower solids, citric acid.
GUARANTEED ANALYSIS (Dry Form):
Crude Protein Min. 6.5%; Crude Fat Min. 2.2%;
Crude Fiber Max. 4.29%; Moisture Max. 7.1%
DIRECTIONS: Add contents of bag to 4 ounces of lukewarm water (102° to 104° F.). Blend until smooth with the consistency of a nectar. Draw as required into a syringe. Each bag yields 8 oz.

TABLE Six-continued

Refrigerate after preparation. Discard after 72 hours. Each bird is unique. Adjust the texture and temperature to your bird's preference.
FEEDING: Using a syringe, feed the bird twice per day, once in the morning and once before the bird retires for the day.

| | | |
|---|---|---|
| Parakeets | <3 ounces | 2 cc/feeding |
| Small Exotics (lovebirds, s. conjures) | <6 ounces | 5 cc/feeding |
| Med. Exotics (Amazons, A. Grays) | <15 ounces | 30 cc/feeding |
| Large Exotics (Macaws, Cockatoo) | >1 pound | 50 cc/feeding |

Healthy Bird adds fluid to your bird's diet. If your bird is allergic to fruit or vegetables, consult your veterinarian.

TABLE Seven

All ingredients in Healthy Bird are part of your bird's natural diet. A healthy bird has feathers which are soft and iridescent. When used with the SUNSET FORMULA, Healthy Bird can provide the nutrition your bird needs.
INGREDIENTS: Apple solids, orange solids, banana solids, wheat flour, oat flour, corn flour, soy flour, barley flour, rye flour, spirulina, wheat grass, citric acid.
GUARANTEED ANALYSIS (Dry Form):
Crude Protein Min. 6.5%; Crude Fat Min. 2.3%;
Crude Fiber Max. 5.04%; Moisture Max. 8.05%
DIRECTIONS: Add contents of bag to 4 ounces of lukewarm water (102° to 104° F.). Blend until smooth with the consistency of a nectar. Draw as required into a syringe. Each bag yields 8 oz. Refrigerate after preparation. Discard after 72 hours. Each bird is unique. Adjust the texture and temperature to your bird's preference.
FEEDING: Using a syringe, feed tbe bird twice per day, once in the morning and once before the bird retires for the day.

| | | |
|---|---|---|
| Parakeets | <3 ounces | 2 cc/feeding |
| Small Exotics (lovebirds, s. conjures) | <6 ounces | 5 cc/feeding |
| Med. Exotics (Amazons, A. Grays) | <15 ounces | 30 cc/feeding |
| Large Exotics (Macaws, Cockatoo) | >1 pound | 50 cc/feeding |

Healthy Bird adds fluid to your bird's diet. If your bird is allergic to fruit or vegetables, consult your veterinarian.

CONCLUSION

Although the present invention has been described in detail with reference to a particular preferred and alternative embodiments of the invention, persons possessing ordinary skill in the art to which this invention pertains will appreciate that various modifications and enhancements may be made without departing from the spirit and scope of the claims that follow. The various components of the Sunrise and Sunset formulas that have been disclosed above are intended to educate the reader about particular preferred and alternative embodiments, and are not intended to constrain the limits of the invention or the scope of the claims. Although the preferred embodiments have been described with particular emphasis on specific volumes, weights and quantities, the present invention may be beneficially implemented with some variation in recipes and proportions.

SEQUENCE LISTING

Not applicable.

What is claimed is:

1. A method of maintaining avian health comprising the steps of:
   mixing flour, fruit and water to produce a morning dietary supplement;
   feeding said morning dietary supplement to a bird;
   mixing flour, fruit, vegetables and water to produce a evening dietary supplement; and
   feeding said evening dietary supplement to a bird.

2. A method as recited in claim 1, in which said flour is wheat flour.

3. A method as recited in claim 1, in which said flour is oat flour.

4. A method as recited in claim 1, in which said flour is soy flour.

5. A method as recited in claim 1, in which said flour is barley flour.

6. A method as recited in claim 1, in which said fruit includes apple solids.

7. A method as recited in claim 1, in which said fruit includes orange solids.

8. A method as recited in claim 1, in which said fruit includes banana solids.

9. A method as recited in claim 1, which further includes spirulina.

10. A method as recited in claim 1, which further includes wheat grass.

11. A method as recited in claim 1, in which said vegetable is broccoli.

12. A method as recited in claim 1, in which said vegetable is carrot.

13. A method as recited in claim 1, in which said vegetable is cauliflower.

* * * * *